UNITED STATES PATENT OFFICE.

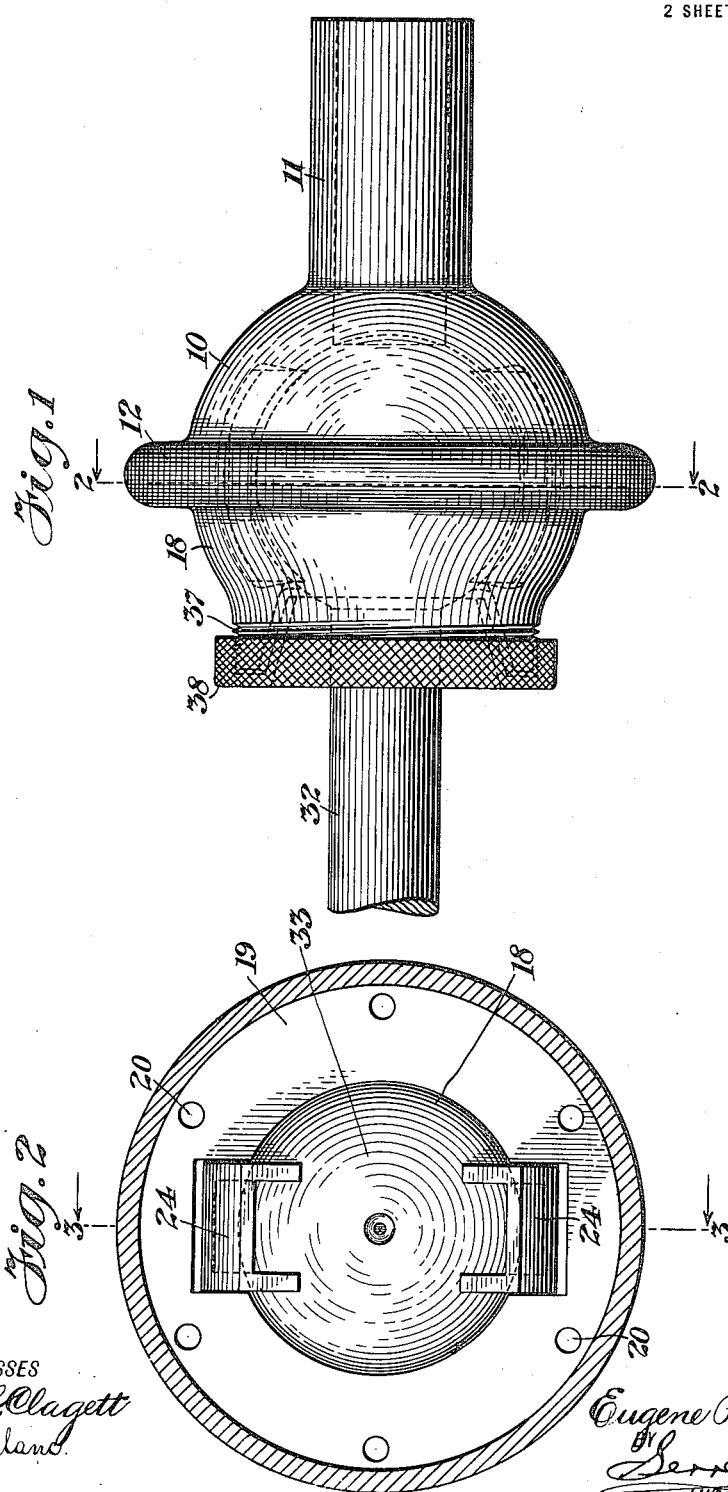

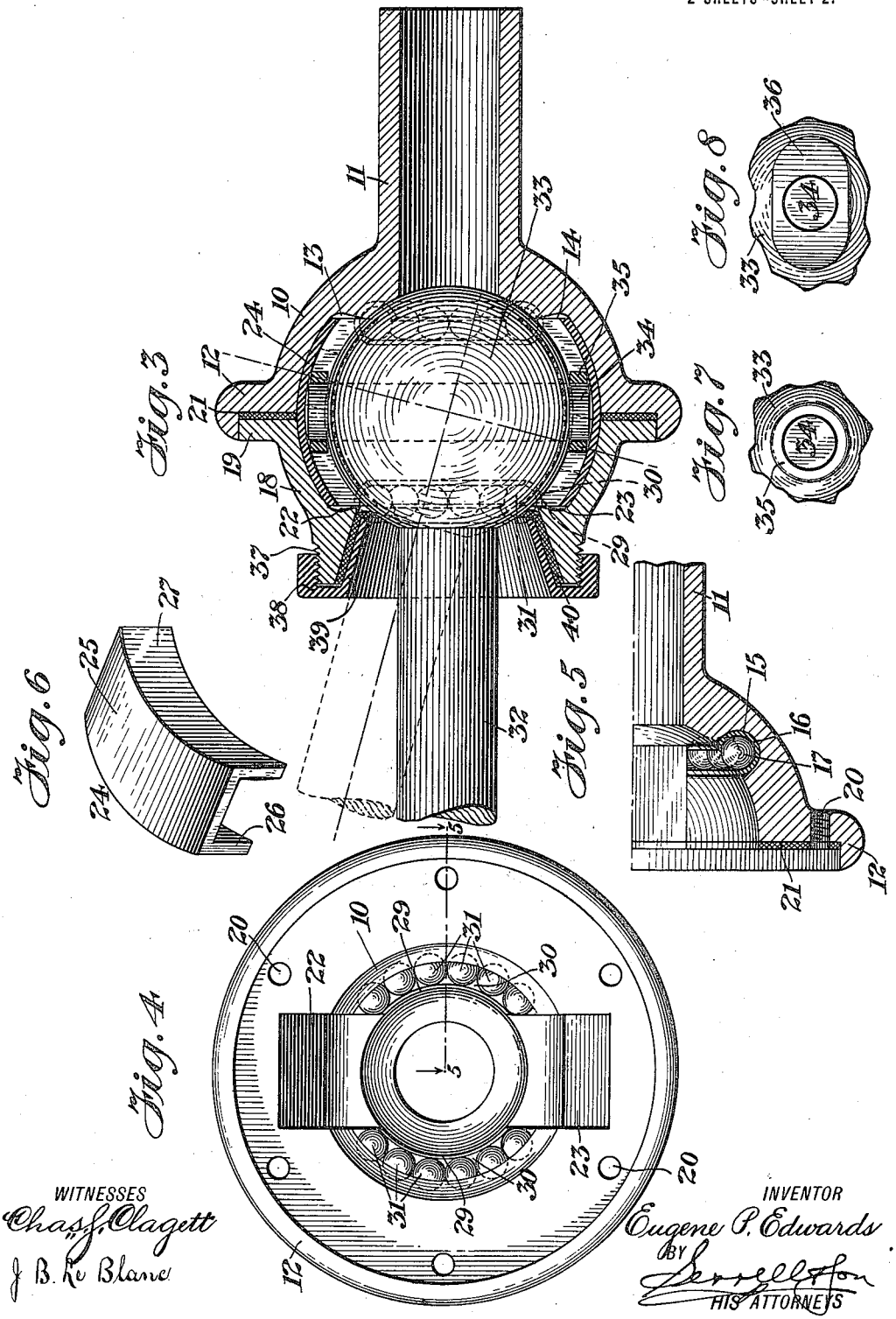

EUGENE P. EDWARDS, OF PLAINFIELD, NEW JERSEY, ASSIGNOR OF ONE-HALF TO HIMSELF AND ONE-HALF TO A. S. GILES, OF PLAINFIELD, NEW JERSEY.

UNIVERSAL JOINT.

1,150,853.

Specification of Letters Patent.

Patented Aug. 24, 1915.

Application filed August 22, 1914. Serial No. 858,017.

*To all whom it may concern:*

Be it known that I, EUGENE P. EDWARDS, a citizen of the United States, residing at Plainfield, in the county of Union and State of New Jersey, have invented an Improvement in Universal Joints, of which the following is a specification.

My present invention relates to a universal joint and is an improvement upon the construction of the universal joint shown and described in Letters Patent No. 1,098,101, granted to me May 26, 1914.

The universal joint made in accordance with my present invention, like that shown and described in the Letters Patent aforesaid, comprises a socket member connected to a shaft end and adapted to receive a spherical member, to which a second shaft end is secured, together with means for turning one shaft end through the revoluble movement imparted to the socket by the other shaft end. In carrying out my present invention, however, I also employ a hardened steel bearing, through which the motion is transmitted, a dust proof cap, to prevent the accumulation of dust and grit within the joint, and also suitable retainers for the ball bearings, all of which will be hereinafter more particularly described.

In the drawing, Figure 1 is a side elevation of my improved universal joint. Fig. 2 is a section on line 2, 2, Fig. 1. Fig. 3 is a longitudinal section on line 3, 3, Fig. 2. Fig. 4 is an end elevation, with the annular socket member removed. Fig. 5 is a partial longitudinal section on line 5, 5, Fig. 4. Fig. 6 is a perspective view of one of the bearing members employed. Fig. 7 is a plan view showing the extremity of the pin which passes through the socket member, and the roller carried thereby, and Fig. 8 is a similar view illustrating the use of a slidable member having parallel sides, in lieu of the rollers shown in Fig. 7.

Referring to the drawing, it will be seen that the universal joint made in accordance with my present invention comprises a socket member 10, to which is suitably secured a sleeve or shaft end, indicated at 11, which is adapted to be driven.

As indicated, the socket is made integral with the sleeve, but as will be understood, may be so constructed or these parts may be made separately and suitably connected. The semi-spherical socket member 10 is provided with a flange 12, one face of which is recessed for a purpose, which will hereinafter appear. In suitable positions, interiorly, the socket member 10 is also provided with recesses 13 and 14, extending longitudinally of the sleeve 11. Also in suitable positions, and interiorly, the socket member 10 is provided with circular recesses 15, each adapted to receive a ball retainer 16, in which the bearing balls 17 are placed to maintain the same position, it being understood that the retainer 16 may be secured in any suitable manner within its recess 15, and that the bearing balls project through a recess provided in the retainer, in order to contact with the adjacent member of the joint. I also employ an annular socket member 18. This is provided with a flange 19 adapted to fit into the recessed portion of the flange 12 of the socket member 10, and these parts are suitably connected by screws or bolts passing through holes provided therefor in the flange 19, and into or through the corresponding holes 20 in the flange 12. Also, as indicated, I may employ a washer 21 between the flanges 12 and 19. The annular socket member 18 is provided with recesses 22 and 23, interiorly thereof, and these recesses are similar in all respects to the recesses 13 and 14, in the socket member 10, and when the parts are in position, the recess 22 alines with the recess 13, and the recess 23 with the recess 14. I also employ hardened steel bearings, indicated at 24. The preferred form of this bearing is clearly shown in Fig. 6, and comprises a base 25 and side members 26 and 27. One of these hardened steel bearings is inserted in the recesses 22 and 13, and the other in the recesses 23 and 14, these recesses being made to receive and contain the bearings. Interiorly, the annular socket member 18 is also provided with circular recesses 29, adapted to receive ball retainers 30, in which there are bearing balls 31. These parts are similar in all respects to the corresponding members hereinbefore described in connection with the semi-spherical socket member 10. My improved joint also comprises a second shaft end 32, at one extremity of which is a spherical head 33, adapted to be received within the said socket members. A pin 34 passes through and is suitably secured in the spherical head 33, with the ends of the pin projecting appreciably beyond the surface of the head at diametrically opposite points. As illustrated in Figs. 3 and 7, rollers 35 are fitted to turn on the extremities of the pin 34, and to contact with and roll against the inner faces of the side members 26 and 27 of the bearings 24, with which the roller is associated. As is indicated in Fig. 8, however, in lieu of rollers 35 I may employ slidable members 36, the opposite sides of which are parallel, and the respective ends rounded, the width of the slidable member being approximately that of the distance between the inner faces of the side members 26 and 27 of the bearings 24, with which it is employed.

The annular socket member 18 is exteriorly screw threaded, as indicated at 37, being thereby adapted to receive a cap 38, provided with an internal flange 39. As clearly shown in Fig. 3, the walls defining the aperture in the annular socket member 18, through which the shaft 32 passes, diverge, and the internal flange 39 of the cap 38 tapers at the same angle. The position of the flange is such that there is an appreciable space between its inner surface and the adjacent surface of the wall defining the aperture in the annular socket member. Within this space, I employ a packing washer 40, the extremity of which is passed over the end of the internal flange 39 and caused to bear against the surface of the spherical head 33, in order to prevent dust and grit from entering the joint, it being manifest that the tighter the cap 38 is turned down on the annular socket member, the greater friction there will be between the packing washer and the spherical head, and the less likelihood of dust or grit entering the joint through the necessary opening in the annular socket.

It will be undestood that the washer 40 may be made of felt, or other similar material, suitable for this purpose.

I claim as my invention:

1. A universal joint comprising a shaft end, a socket member secured thereto, an annular socket member attached to the aforesaid socket member, a second shaft end, a spherical head on the said second shaft end fitting within the said socket members, means for transmitting rotary motion from said head to said members, a cap secured to the said annular socket member and having a part which extends into the opening therein and lies parallel, in a spaced position, to the walls defining said opening, and a member lying partially within the space between a part of the said cap and the wall defining the opening in the annular socket member and extending inwardly from the same sufficiently far to bear against the surface of the spherical head.

2. A universal joint comprising a shaft end, a socket member secured thereto, an annular socket member attached to the aforesaid socket member, a second shaft end, a spherical head on the said second shaft end fitting within the said socket members, means for transmitting rotary motion from said head to said members, a cap secured to the said annular socket member, and having an internal flange extending into the opening in the annular socket member so as to lie in a position spaced apart from the wall defining the said opening, and a washer of flexible material between the said internal flange and the wall defining the opening in the annular socket member and extending therefrom with its inner end in contact with the spherical head.

3. A universal joint comprising a shaft end, a socket member secured thereto, an annular socket member attached to the aforesaid socket member, a second shaft end, a spherical head on the said second shaft end fitting within the said socket members, a pin extending through the said spherical head and projecting beyond the same at diametrically opposite points, hardened bearings in the said socket members and into recesses in which the projecting ends of the said pin extend, a cap secured to the said annular socket member, and having an internal flange extending into the opening in the annular socket member so as to lie in a position spaced apart from the wall defining the said opening, and a washer of flexible material between the said internal flange and the wall defining the opening in the annular socket member and extending therefrom with its inner end in contact with the spherical head.

4. A universal joint comprising a shaft end, a semi-spherical socket member secured thereto, an annular socket member connected to the said semi-spherical socket member, a second shaft end, a spherical head fitting within the said socket members and secured to the said second shaft end, which extends through the opening in the annular socket member, a pin extending through the said spherical head and projecting beyond the same at diametrically opposite points, the said socket members being provided interiorly with recesses, hardened bearings fitted in the recesses in the said socket members, a roller fitted on each projecting end of the said pin and adapted to fit and operate within its bearing and through which the rotary motion from one shaft end is transmitted through the said socket members to the other shaft end, a cap adjustable to position on the annular socket member, and having a flange extending into the opening in the annular socket member and parallel with the wall defining the same, and a washer between the said flange and the wall defining the opening in the annular socket member and extending over the edge of the said flange and in contact with the adjacent surface of the spherical head to exclude dust from the joint.

Signed by me this 15th day of August 1914.

EUGENE P. EDWARDS.

Witnesses:
 T. S. VAIL,
 E. THORP.